United States Patent
Battagin et al.

(10) Patent No.: US 7,533,420 B2
(45) Date of Patent: May 12, 2009

(54) SYSTEM AND METHOD FOR RESTRICTING USER ACCESS TO A NETWORK DOCUMENT

(75) Inventors: Daniel C. Battagin, Bellevue, WA (US); Ira Levin, Seattle, WA (US); Eran Megiddo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 775 days.

(21) Appl. No.: 11/007,862

(22) Filed: Dec. 9, 2004

(65) Prior Publication Data

US 2006/0129809 A1   Jun. 15, 2006

(51) Int. Cl.
   *G06F 17/30*   (2006.01)
(52) U.S. Cl. .............................. 726/26; 726/29; 713/165
(58) Field of Classification Search .................. 726/26, 726/29; 713/165
   See application file for complete search history.

(56) References Cited

U.S. PATENT DOCUMENTS

| | | | | |
|---|---|---|---|---|
| 5,495,533 | A  * | 2/1996 | Linehan et al. | 713/155 |
| 6,931,532 | B1 * | 8/2005 | Davis et al. | 713/167 |
| 7,308,717 | B2 * | 12/2007 | Koved et al. | 726/27 |
| 2002/0035568 | A1 * | 3/2002 | Benthin et al. | 707/102 |
| 2004/0237035 | A1 * | 11/2004 | Cummins | 715/513 |

FOREIGN PATENT DOCUMENTS

| | | |
|---|---|---|
| DE | 100 51 571 A1 | 4/2001 |
| EP | 0 715 243 A1 | 6/1996 |
| EP | 1 513 075 A2 | 3/2005 |
| WO | WO 02/01271 A1 | 1/2002 |
| WO | WO 03/081467 A2 | 10/2003 |

OTHER PUBLICATIONS

Michiharu Kudo and Satoshi Hada, "XML document security based on provisional authorization", ISBN: 1581132034, 2000.*

* cited by examiner

*Primary Examiner*—Kambiz Zand
*Assistant Examiner*—Peter Poltorak
(74) *Attorney, Agent, or Firm*—Merchant & Gould; Ryan T. Grace

(57) ABSTRACT

A system and method for restricting a client's access to sensitive material in a network document. The system includes a document storage component for storing documents having an associated level of access. The system also includes a server component for receiving a document request from a user, associating the document request with the level of access of the requested document, and sending a server request if the level of access is limited. The system further includes a document governor component for receiving the server request, sending a governor request to the document storage component, receiving an unrestricted document from the document storage component, processing the unrestricted document to limit rights according to the level of access, and sending a limited document to the server in order to allow a user accessibility to the restricted document.

25 Claims, 7 Drawing Sheets

402        404              408

|   | A | B | C | D | E | F | G | H | I |
|---|---|---|---|---|---|---|---|---|---|
| 1 | | | | | Black Scholes Option Pricing (Div. Ext.) | | | | |
| 2 | | | | | | | | | |
| 3 | Calculations | | | | Inputs | | | | |
| 4 | | No Dividend | With Dividend | | S: underlying asset price | $100.000 | | | |
| 5 | d1 | 45.98199436 | 45.64237655 | | X: exercise price | $80.000 | | | |
| 6 | N(d1) | 1 | 1 | | RF: risk-free rate | 3.00% | | | |
| 7 | | | | | s: annualized volatility | 1.70% | | | |
| 8 | d2 | 45.97708688 | 45.63746908 | | t: years to expiration | 0.083 | | | |
| 9 | N(d2) | 1 | 1 | | Dividend yield | 2.00% | | | |
| 10 | | | | | | | | | |
| 11 | | | | | | | | | |
| 12 | | | | | Implied annual dividend | $2.000 | | | |
| 13 | | | 406 | | Effective asset price (S) | | | | |
| 14 | | | | | with continuous dividend | $99.833 | | | |
| 15 | | | | | | | | | |
| 16 | | | | | | Basic Model | Constant Yield | | |
| 17 | | | | | | (No Dividend) | (With Dividend) | | |
| 18 | | | | | Call Value | $20.1998 | $20.0332 | | |
| 19 | | | | | Call Delta (hedge ratio) | 1.000 | 0.998 | | |
| 20 | | | | | | | | | |

|   | A | B | C | D | E | F | G |
|---|---|---|---|---|---|---|---|
| 1 | | | | | Black Scholes Option Pricing (Div. Ext.) | | |
| 2 | | | | | | | |
| 3 | Calculations | | | | Inputs | | |
| 4 | | No Dividend | With Dividend | | S: underlying asset price | $100.000 | |
| 5 | d1 | 45.98199436 | 45.64237655 | | X: exercise price | $80.000 | |
| 6 | N(d1) | 1 | 1 | | RF: risk-free rate | 3.00% | |
| 7 | | | | | s: annualized volatility | 1.70% | |
| 8 | d2 | 45.97708688 | 45.63746908 | | t: years to expiration | 0.083 | |
| 9 | N(d2) | 1 | 1 | | Dividend yield | 2.00% | |
| 10 | | | | | | | |
| 11 | | | | | | | |
| 12 | | | | | Implied annual dividend | $2.000 | |
| 13 | | | | | Effective asset price (S) | | |
| 14 | | | | | with continuous dividend | $99.833 | |
| 15 | | | | | | | |
| 16 | | | | | | Basic Model | Constant Y |
| 17 | | | | | | (No Dividend) | (With Divid |

*Fig.6*

SYSTEM AND METHOD FOR RESTRICTING USER ACCESS TO A NETWORK DOCUMENT

BACKGROUND OF THE INVENTION

With the advent and explosion of the Internet, computer users have grown accustomed to conveniently accessing virtually any kind of electronic document from virtually any location. In particular, the proliferation of the Work Wide Web (the "Web") and Web browser application programs have made accessing many kinds of documents, such as text and graphics documents, very convenient. Through a Web browser application program, a user can access and view many types of electronic documents without the need for additional software.

In light of Internet proliferation, documents may be disseminated in many ways. In order for other users to access the content of a document, copies of the document or portions of it may be made. For instance, in many scenarios the document is sent to other users via an electronic mail ("e-mail") message. The users that receive the document can then perform analysis on the document, manipulate the document, or add the document to another application. Alternatively, the document may be stored on a file share server where multiple users can access contents of the document. In such situations, the users receive an unrestricted document and may modify, manipulate or copy the information in any manner they see fit.

SUMMARY OF THE INVENTION

Several situations may exist where a document administrator does not want a client to have full rights to a document. For example, a document may include sensitive information (e.g. external data references) or intellectual property data. In such a situation a document administrator may want to allow clients to view a document but not view underlying formulas, expressions or equations that make up a document. In other situations, a document administrator may not want clients to view edits or prior versions of a document. In yet other situations, a document administrator may not want a client to view personalized information in a document. In still other situations, a document administrator may want to maintain a single master version of a document that cannot be modified by viewing clients. In such cases, a document administrator may only give a client a limited right.

Aspects of the present invention relate to a system and method for restricting a user's access to sensitive material in a network document while providing insensitive material to the user. One aspect of the present invention includes a computer-implemented method for restricting a level of access to a network document. The computer-implemented method may include steps for receiving a document request and determining a level of access to the document. The computer-implemented method may also include steps for receiving the document, wherein data associated with the document is unrestricted and restricting the document according to the determined level of access so that at least a portion of the data associated with the document is unavailable for access.

In accordance with another aspect of the present invention, the present invention may include a computer-readable medium having computer-executable instructions for receiving a document request on behalf of a client having limited access rights and retrieving an unrestricted requested document on behalf of the client. The instructions may also include steps for processing the unrestricted requested document to restrict at least a portion of the document according to the limited access rights and making the restricted document accessible to the client.

Yet another aspect of the present invention may include a computer-readable medium having a document storage component, a server component and a document governor component. The document storage component may be configured for storing documents having an associated level of access. The server component may be configured for receiving a document request, associating the document request with the level of access of the requested document, and sending a server request if the level of access is limited. The document governor component may be configured for receiving the server request, sending a governor request to the document storage component, receiving an unrestricted document from the document storage component, processing the unrestricted document to limit rights according to the level of access, and sending a limited document to the server.

BRIEF DESCRIPTION OF THE DRAWINGS

FIG. 4 illustrates an exemplary detail of the present invention where a user has full rights to a spreadsheet document.

FIG. 6 illustrates an exemplary detail of the present invention where a user may have limited rights to a spreadsheet document.

DETAILED DESCRIPTION

Figure 1:
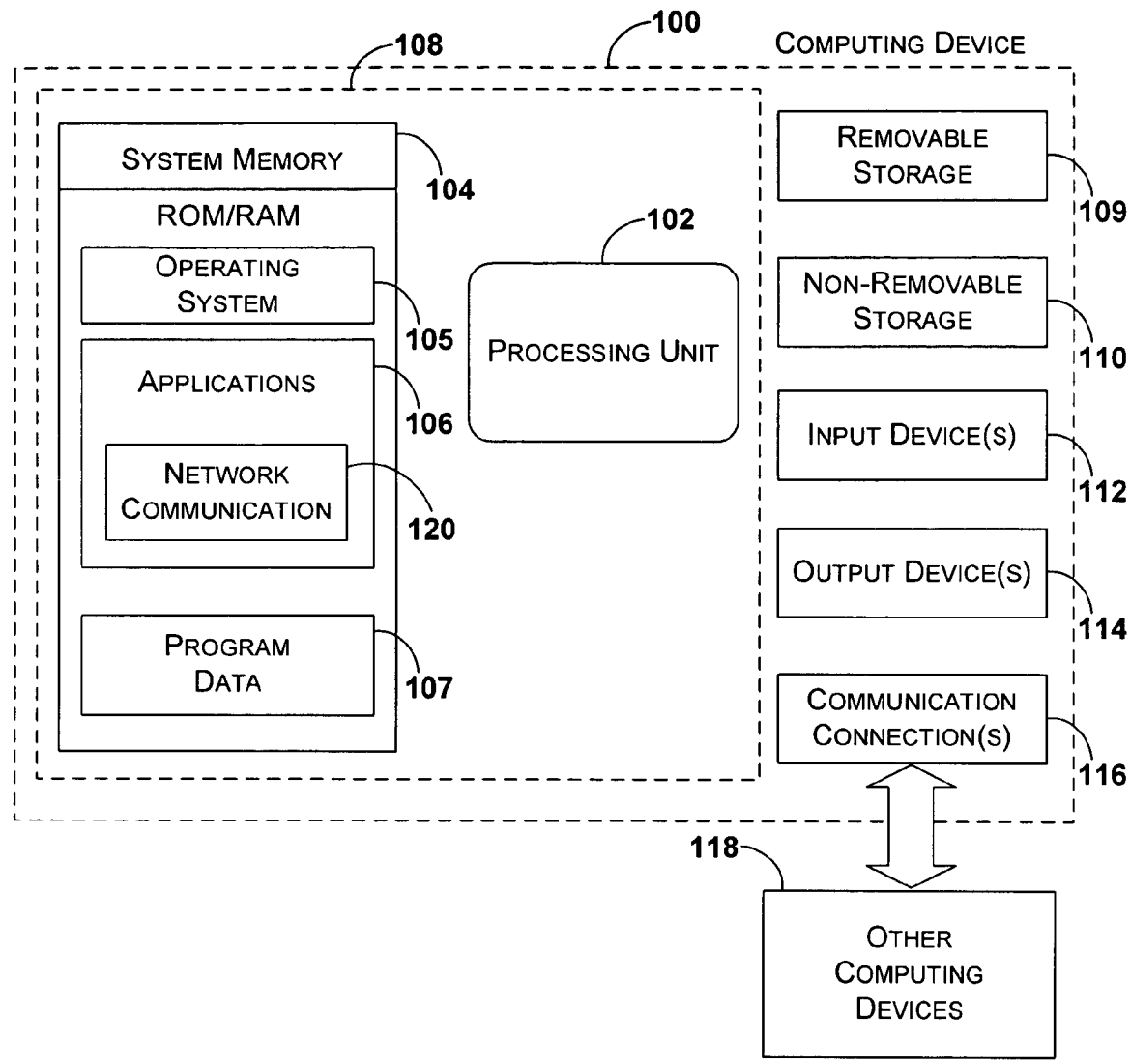
FIG. 1 illustrates an exemplary computing device that may be used in one aspect of the present invention.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Embodiments of a Method and System for Restricting User Access to a Network Document FIGS. 3-6 represent a general overview of the present invention and exemplary details regarding the usability of the present invention. The present invention relates to a system and method for restricting a user's access to sensitive data in a network document. Even though the present invention is described herein with reference to a spreadsheet document, may also be restricted from other documents such as word processing documents, ADOBE documents, workbooks, web pages, emails, notes or any other type of document where restriction or limited rights are desired. It should be appreciated that, according to one embodiment of the invention, a spreadsheet document comprises the EXCEL spreadsheet application program from MICROSOFT CORPORATION headquartered in Redmond, Wash.

As one general example of the present invention, a document administrator may manage a document that includes sensitive information. In order for other users to access the content of a document, copies of the document or portions of it may be made and disseminated. For instance, in many scenarios the document is sent to other users via an electronic mail ("e-mail") message. The users that receive the document can then perform analysis on the document, manipulate the document, or add the document to another application.

Alternatively, the document may be stored on a file share server where multiple users can access the contents of the document. FIGS. 3 and 4 represent an exemplary aspect of the present invention to be compared with FIGS. 5 and 6 as further set forth below. The system 300 represents a general overview of a system for accessing documents on a server. The system 300 includes the client 302 having access to the server 304 through the network 306. The client 302 may include any type of client having access to the server 304. The client 302 may include a computing device such as computing device 100 described above in conjunction with FIG. 1. The client may also include a mobile computing device such as the mobile computing device 200 described above in conjunction with FIG. 2. The client 302 may include a single user, a group of users or a network of users.

The client 302 may include a number of program modules and data files stored on the client 302. The client 302 may have a Web browser application that is operative to request, receive, render, and provide interactivity with electronic documents, such as a Web page that has been formatted using HTML. According to one embodiment of the invention, the Web browser application comprises the INTERNET EXPLORER Web browser application program from MICROSOFT CORPORATION. It should be appreciated, however, that other Web browser application programs from other manufactures may be utilized to embody various aspects of the present invention, such as the FIREFOX Web browser application from the MOZILLA FOUNDATION headquartered in Mountain View, Calif.

The server 304 may include any type of server that is capable of access to a content database 308. In one embodiment, the server 304 is a file share server. It should be appreciated that, according to another embodiment of the invention, the server 304 is a WINDOWS SHAREPOINT SERVER from MICROSOFT CORPORATION. In yet another embodiment of the invention, the server 304 includes an EXCEL CALCULATION SERVER program from MICROSOFT CORPORATION.

As an example of Internet retrieval of a spreadsheet document, the client 302 may access a spreadsheet calculation server via the Internet. The access may take the form of a document request. The document request will identify the client making the request and the Uniform Resource Locator ("URL") of the requested document. The server 304 may then perform a check. The server 304 accesses the content database 308 to verify that the client has access rights to the document. In one embodiment, these access rights are determined by an access control list ("ACL") associated with the document. The ACL may include a set of data that notifies a computer operating system regarding permissions or access rights, that each user has to a specific system object such as a directory or file. If the client 302 has unrestricted rights to the document, the document is sent from the content database 308 to the server 304. In the situation where the network includes the Internet, an intranet or the like, the server 304 may then process the document so that it is in a viewable form for the client. In one embodiment of the present invention, the server converts the document into HyperText Markup Language (HTML) so that a user may view the document. However, it is possible that the client has access to the raw document through the Internet. Other processing at the server will be further set forth below.

FIG. 4 represents an exemplary detail of the present invention where a user has unrestricted rights to a spreadsheet document. The Web page 400 may comprise a viewable representation of the spreadsheet document. In particular, the Web page 400 may include HTML and scripts which, when displayed by the Web browser, provide a visual display for a spreadsheet. Moreover, the scripts included in the Web page allow a client to interact with the display and modify the spreadsheet. The Web page 400 may include the plurality of columns 402 along with the plurality of rows 404. The columns 402 and rows 404 intersect at various cells such as cell 406. In many situations, the cell 406 contains a calculated value or number. The calculated number or value may be the result of a formula or dependency. In the situation where a client has unrestricted rights to the Web page 400, the formula field 408 may be located at the top of the spreadsheet for displaying the formula related to cell 406.

As is contemplated by the present invention, several situations may exist where a document administrator does not want a client to have full rights to a document. For example, a document may include sensitive information (e.g. external data references) or intellectual property data. In such a situation a document administrator may want to allow clients to view a document but not view underlying formulas, expressions or equations that make up a document. In other situations, a document administrator may not want clients to view edits or prior versions of a document. In yet other situations, a document administrator may not want a client to view personalized information in a document. In such cases, a document administrator may only give a client a limited right. Such restricted or limited rights may include a read right, an execute right, a delete right, a browse right or the like. In one preferred embodiment of the present invention, the document administrator gives a client a browse right.

Figure 5:
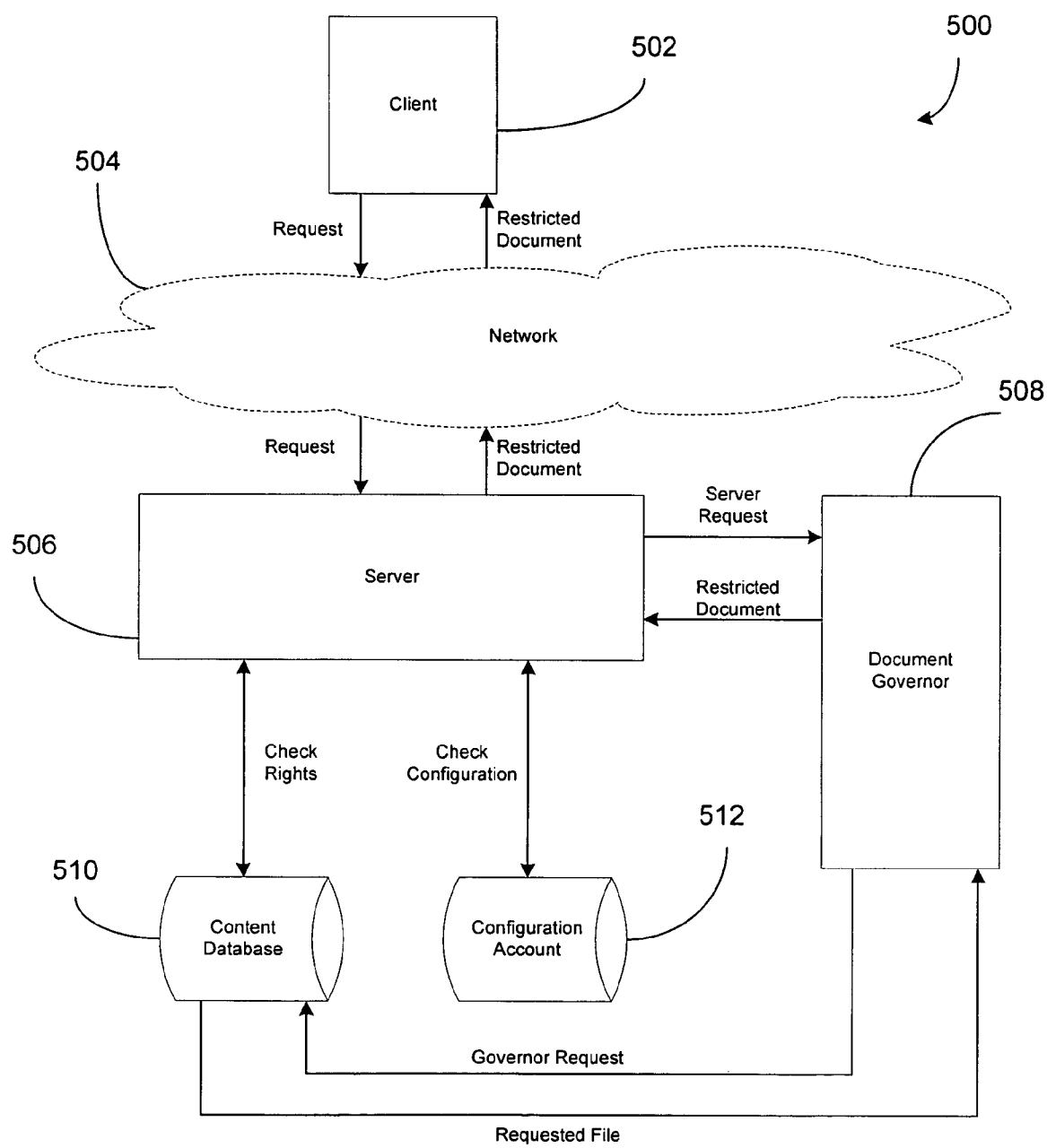
FIG. 5 illustrates an exemplary system for retrieving a restricted document from a server that may be used in one aspect of the present invention.

FIGS. 5 and 6 represent an exemplary aspect of the present invention to be compared with FIGS. 3 and 4 above. FIG. 5 represents one aspect of the system and method for restricting user access to a network document and FIG. 6 represents an exemplary detail of the present invention where a user has limited rights to a spreadsheet document.

The system 500 represents a general overview of a system for accessing a document associated with a limited right. The system 500 includes the client 502 that requests access to a document. The client 502 is described above in conjunction with FIG. 3. The client 502 may have access to the network 504. The network 504 may include any type of network. In one embodiment, the network includes the Internet. The system 500 also includes the server 506. The server is described above in conjunction with FIG. 3; however, in one embodiment of the process 500, the server is a WINDOWS SHAREPOINT SERVER from MICROSOFT CORPORATION.

Reference number 508 is a document governor. The document governor 508 may include several embodiments. In one embodiment, the document governor 508 is an application or program associated with the server 506. In another embodiment, the document governor 508 is a Web-based application.

In yet another embodiment, the document governor is a spreadsheet calculation server. Patent application Ser. No. 10/607,780, filed Jun. 27, 2003, titled "METHOD AND APPARATUS FOR VIEWING AND INTERACTING WITH A SPREADSHEET FROM WITHIN A BROWSER" is incorporated herein by reference to provide a detailed embodiment of one type of document governor 508. As more fully set forth below, the document governor 508 "processes" the document to restrict intellectual property data or sensitive data.

Process 500 also includes a content database 510 and a configuration account 512. The content database 510 includes document storage, user accounts, and client rights. The configuration account 512 has information regarding the configuration of the server. For example, the configuration account 512 may include data that indicates that the document governor 508 is accessible to the server 506.

In explaining the system 500 references will be made to a spreadsheet document, a spreadsheet calculation server, a WINDOWS SHAREPOINT SERVER and a browse right. These references are for explanatory purposes only. In view of the disclosure herein, several configurations for the system 500 may be used. Also, various restrictions may be imposed on a document apart from rights set forth above. Furthermore, the system 500 may be used in conjunction with several types of documents apart from a spreadsheet document.

In one embodiment, the client 502 sends a document request to the server 506. The document request may comprise a client selecting a document associated with the server. The document request will identify the client making the request and the Uniform Resource Locator ("URL") of the requested document. The server 506 may then perform a check to determine if the user has unrestricted rights to the requested document by comparing the URL and client information to the content database 510. The content database 510 may include a document store and the rights to those documents. In one embodiment, the client rights are associated with the document in the form of an ACL. In the situation, where the client rights indicates that the client 502 has unrestricted rights to a document, the process continues as described above in conjunction with FIG. 3.

In comparison to FIG. 3, several situations may exist where the client 502 has restricted rights to the requested document. If a user is completely restricted (no rights) from a document, the server 506 may send a message to the client 502 indicating that the client 502 is restricted from access. In another embodiment, if the client 502 is completely restricted from a document, the client may not be able to view the document icon when accessing the server 506. Stated another way, the client 502 does not know that the document exists when the client 502 connects to the server 506.

In another situation, the client 502 may be given a limited rights to the document. Such limited rights may include, but are not limited to, a read right, an execute right, a delete right, or a browse right. In one embodiment, the limited right is a browse right. When a limited right is given, the content database 510 receives the URL and user information from the server 506. In one embodiment, this information is compared to an ACL associated with the requested document. The ACL may identify the document and client rights to the document. It is further contemplated that a document header or footer may identify the document and the client rights to the document. In the situation where the client 502 only has a limited right, the server 506 determines if the configuration of the system 500 allows a restricted document to be transmitted to the client 502. As is more fully set forth below, if the system 500 cannot ensure that all intellectual property material or sensitive material is removed from the document, the client 502 is completely restricted from the document.

Once a limited right is determined, the configuration of the system 500 is checked in association with the configuration account 512. The configuration account 512 includes information associated with the configuration of the system 500. For example, the configuration account 512 may include information regarding accessible programs, modules or related servers. The configuration account 512 may also indicate if the server 506 has access to the document governor 508. If the client 502 has a limited right but the server does not have access to the document governor 508, the server 506 may indicate to the client 502 that the client has no rights to the document. If the client 502 has a limited right and the server has access to the document governor 508 but the communication between the server 506 and document governor 508 is interrupted, the server 506 may indicate to the client 502 that the request has timed-out. If the client 502 has a limited right and the server has access to a document governor 508 but the communication between the document governor 508 and the content database 510 is interrupted, the server 506 may also indicate to the client 502 that the request has timed-out.

Where a limited right is determined and the document governor 508 is associated with the server 506, the server 506 may send a server request to the document governor 508 on behalf of the client 502. The request may indicate the identity of the client 502 and the URL of the document as set forth above. In one embodiment of the present invention, the document governor includes a spreadsheet calculation server as exemplified by incorporated patent application Ser. No. 10/607,780, as stated above. In another embodiment, the document governor is an application on the server 506. In yet another aspect of the present invention, the document governor includes a Web-based program. Other types of document governors are contemplated as long as the document governor is capable of processing the document. The document governor sends a governor request to the content database requesting unrestricted access to the document on behalf of the client 502. The governor request includes at least the URL of the requested document. The content database 510 responds to the governor request by transmitting an unrestricted document to the document governor 508.

After the documents governor 508 receives the document, the document may be processed. Patent application Ser. No. 10/903,568, filed Jul. 30, 2004, titled "METHOD, SYSTEM AND APPARATUS FOR EXPOSING WORKBOOKS AS DATA SOURCES" is incorporated herein by reference to provide a detailed exemplary embodiment of one type of processing. Patent application Ser. No. 10/858,175, filed Jun. 1, 2004, titled "METHOD, SYSTEM AND APPARATUS FOR EXPOSING WORKBOOK RANGES AS DATA SOURCES" is incorporated herein by reference to provide a detailed exemplary embodiment of another type of processing. Patent application Ser. No. 10/858,190, filed Jun. 1, 2004, titled "METHOD, SYSTEM, AND APPARATUS FOR DISCOVERING AND CONNECTING TO DATA SOURCES" is incorporated herein by reference to provide a detailed exemplary embodiment of yet another type of processing.

The processing of the document may also include the document governor 508 restricting access to a portion of the document. For example, if the document is a spreadsheet document, the document governor may restrict access to the underlying formulas of the spreadsheet. The document governor 508 may process the spreadsheet to remove the formula cell 408 shown in conjunction with FIG. 4, thereby restricting a client's access to the underlying formula of the cell. As another example, the document governor 508 may prevent a client's access to personal notes, document drafts, draft modifications, external data references or other sensitive material. In yet another embodiment, the document governor 508 may produce a Web-based representation of the document that does not include the intellectual property or sensitive data. Such a Web based representation may include an Extensible Markup Language ("XML") representation or HTML representation of the document. The Web-based representation may exclude a representation of the sensitive material.

Once the document has been processed by the document governor 508, the document governor 508 transmits the restricted document to the server 506. In the situation where the document governor 508 is an application on the server 506, the document governor 508 may transfer the document to another application for further processing. In one embodiment of the present invention, the server 506 may perform further processing on the document such as converting the document from XML to HTML. The server 506 may then transmit a viewable restricted document to the client 502.

In comparison to FIG. 4, FIG. 6 represents an exemplary detail of the present invention where a user has restricted access to a spreadsheet document. The Web page 600 may comprise a viewable representation of the spreadsheet document. In particular, the Web page 600 may include HTML and scripts which, when displayed by the Web browser, provide a visual display for a spreadsheet. Moreover, the scripts included in the Web page allow a client to interact with the display and modify the spreadsheet. However, it is entirely within the scope of the present invention that the spreadsheet document is all or a portion of the actual spreadsheet file and not a representation. In comparison to FIG. 4, in the situation where a client has restricted access to the Web page 600, the Web page 600 has an open field 602, a formula cell is not located at the top of the spreadsheet and underlying sensitive information is not accessible to the client. As stated above, it is contemplated that any type of sensitive information may be restricted from any type of document.

Figure 7:
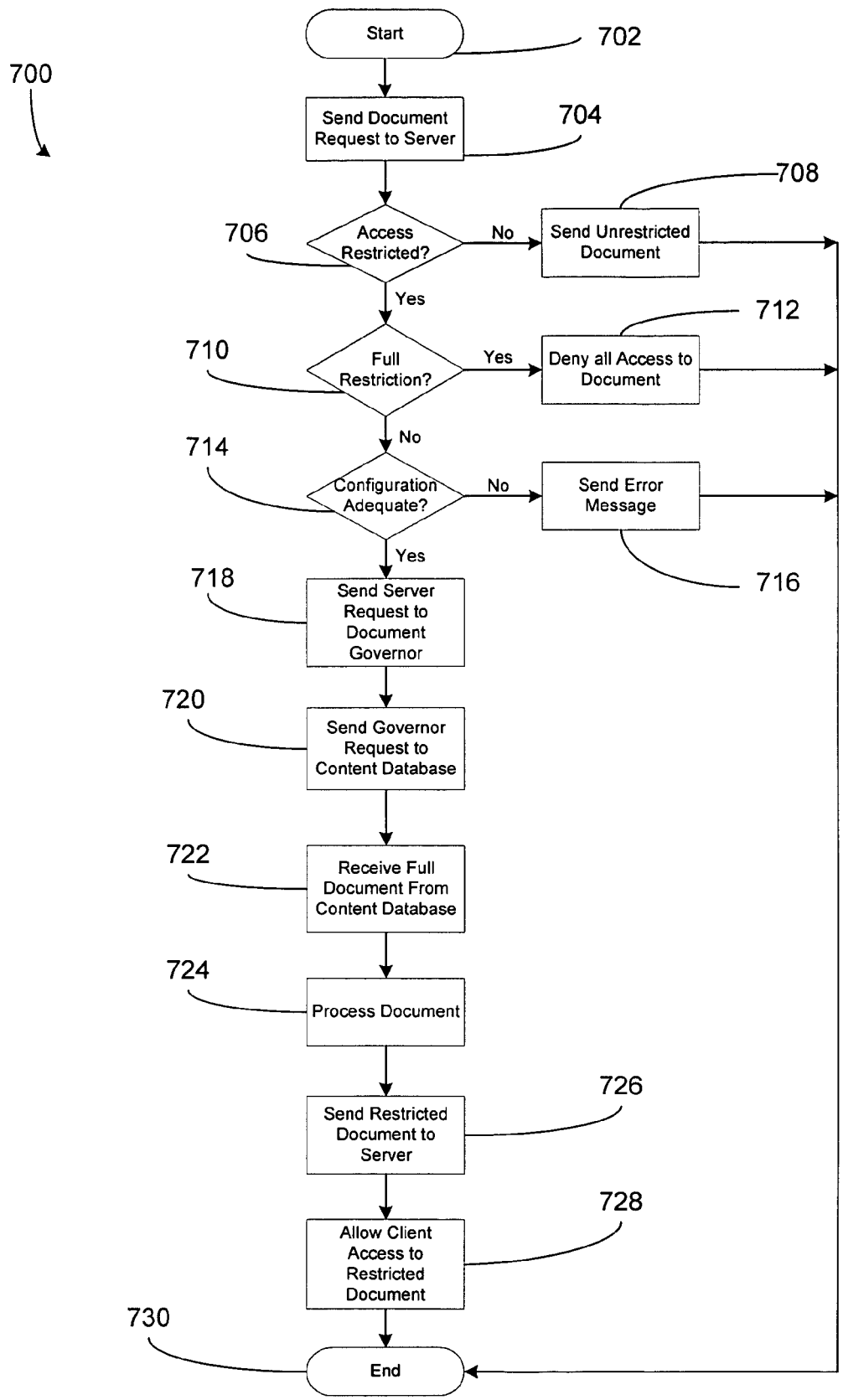
FIG. 7 illustrates a logical flow diagram of one aspect of the present invention.

FIG. 7 represents a logical flow diagram of one aspect of the present invention. The process starts at the starting block 702 and continues to block 704 where a document request is sent to a server. The document request may be sent from a client having access to the Internet, such as the request set forth above in conjunction with FIG. 3. However, in other aspects of the present invention the request is sent in a closed network. In one embodiment, the request includes the URL of the document and an identification of the client making the request.

The process 700 continues to block 706 where it is determined if the client is restricted from accessing the document. As previously stated, this restriction may be determined by comparing an ACL of the document to the client associated with the request. If the ACL indicates that the client is unrestricted, the process 700 continues to block 708 where the server accesses a document storage and the entire unrestricted document is sent to the client as more fully described above. Again, it is contemplated that other indicators apart from an ACL may indicate rights. Such other indicators may include a header, footer or a separate application program associated with the server. In one embodiment of the present invention, the server processes the document so that the document is viewable to the client over the Internet. After the unrestricted document is sent to the client, the process 700 ends at end block 730.

If access is restricted, the process 700 continues to block 710 where it is determined if the restriction is a full restriction. If the restriction is a full restriction, the client is denied all access to the document as indicated by block 712. In one embodiment of the present invention, an ACL associated with the document may indicate that the client does not have access rights to the document. If the client has no rights to the document, all access is restricted to the document and the server may send a message to the client indicating that all access is restricted. In another embodiment, if the client is completely restricted from a document, the client will not be able to view the document icon when accessing the server. Stated another way, the client will not know that the document exists when the client connects to the server. Following block 712, the process ends at end block 730.

If the client has limited rights, the process 700 continues to block 714 where the server determines if the configuration is adequate to send the client a restricted document. As more fully set forth above, an error message or a timed-out message may be sent to the client as indicated by block 716, if the configuration is not adequate.

If the client has limited rights to the document and access is adequate, the process 700 continues to block 718. At block 718, the server sends a server request to a document governor. The server request will indicate the client and the URL of the document as set forth above. The process then continues to block 720 where the document governor receives the server request and sends a governor request to the content database on behalf of the client. The governor request may be a request for unrestricted access to the document.

The process 700 continues to block 722 where the content database sends the document governor an unrestricted document. Such an unrestricted document may include the raw document. As more fully set forth above, the document governor may process the document to at least restrict access to a portion of the document. For example, if the document is a spreadsheet document, the document governor may restrict access to the underlying formulas of the spreadsheet document. The document governor may process the spreadsheet document to remove a formula cell, thereby restricting a client's access to the underlying formula of a cell. In another embodiment, the document governor may produce a Web-based representation of the spreadsheet document that does not include the intellectual property or sensitive data. Such a Web-based representation may include an Extensible Markup Language ("XML") representation or HTML representation of the spreadsheet document. It is further contemplated that a document administrator may indicate sensitive material to be removed in any number of documents in addition to spreadsheet documents. Such other document may include a word processing document, an Internet document, a graphical document, a note or an email. It is also contemplated that the document governor may perform further processing on the document to facilitate the usability of the document to the user. Such processing is further set forth above in conjunction with FIG. 5.

The process 700 continues to block 726 where the document governor sends the restricted document (or document representation) to the server. As stated above, in one embodiment of the present invention, the server may perform further processing on the restricted document, such as converting the document from XML to HTML. The process 700 continues to block 728 where the client is allowed access to the restricted document. This restriction may include limiting the client's rights to a browse right. Other types of rights are contemplated, as more fully stated above. The process then continues to end block 730 where the process 700 ends.

Illustrative Operating Environment

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. In one embodiment, applications 106 further include an application 120 for communicating with a network. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
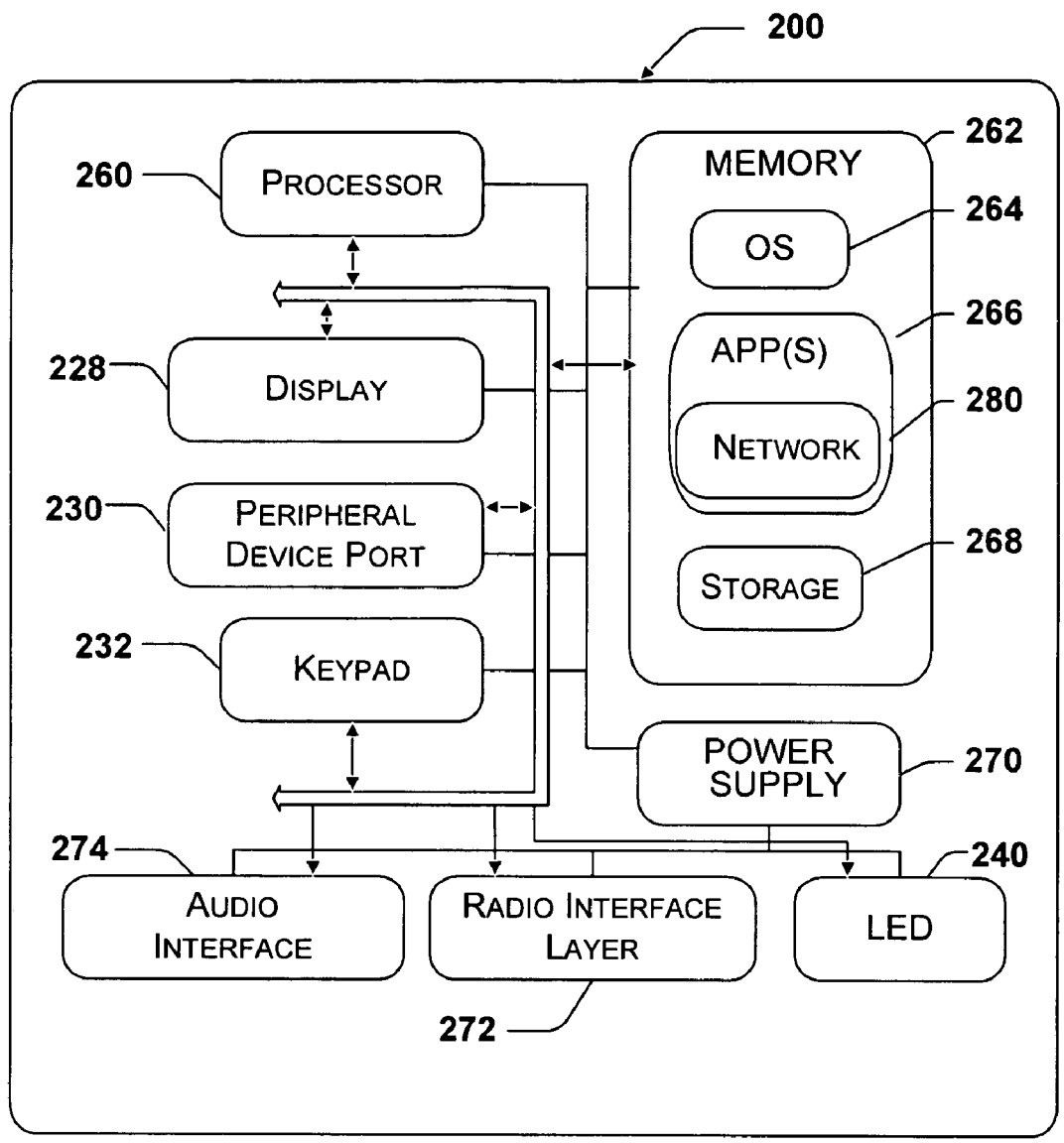
FIG. 2 illustrates an exemplary mobile device that may be used in one aspect of the present invention.
Figure 3:
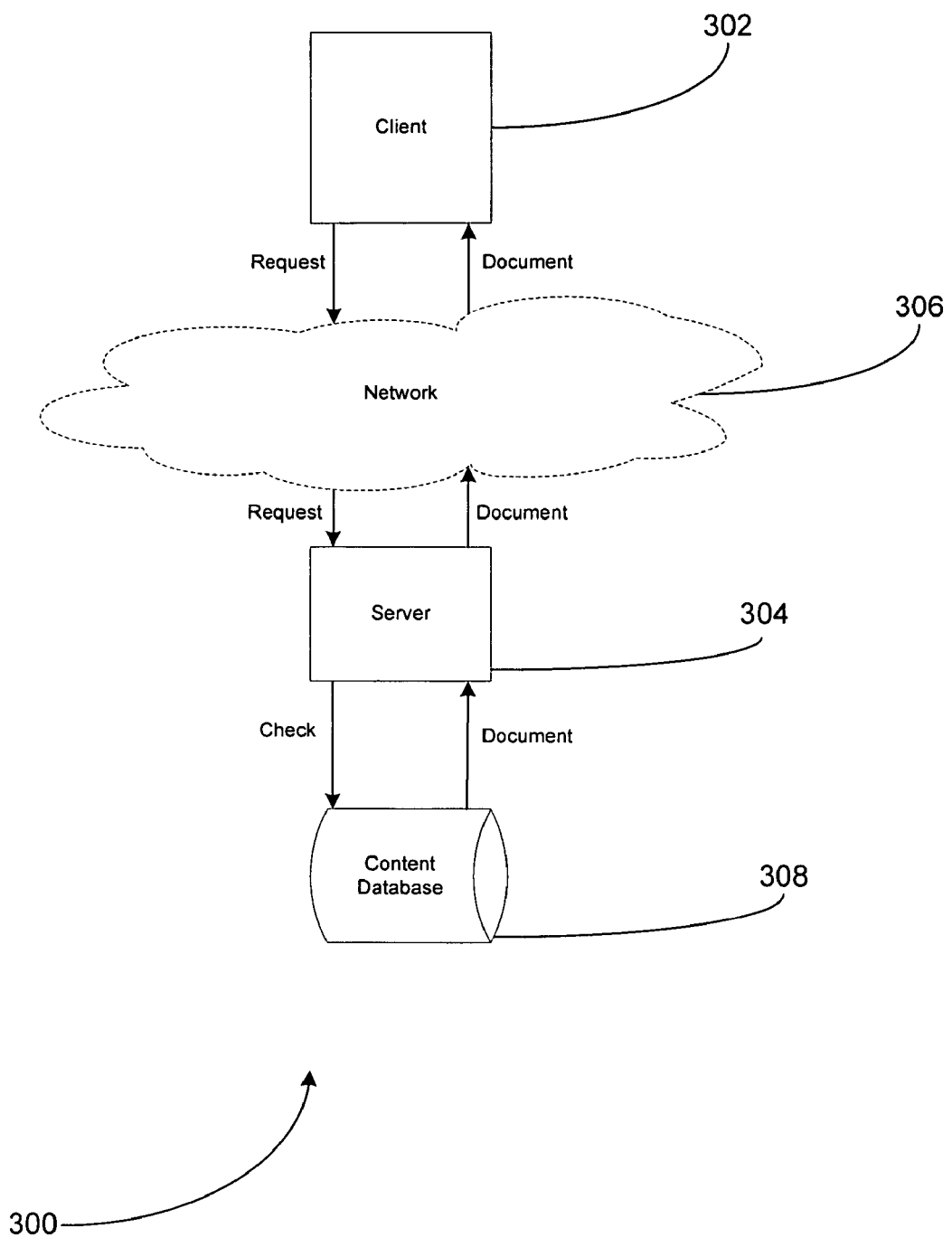
FIG. 3 illustrates an exemplary system for retrieving an unrestricted document from a server that may be used in one aspect of the present invention.

FIG. 2 illustrates a mobile computing device that may be used in one exemplary embodiment of the present invention. With reference to FIG. 2, one exemplary system for implementing the invention includes a mobile computing device, such as mobile computing device 200. The mobile computing device 200 has a processor 260, a memory 262, a display 228, and a keypad 232. The memory 262 generally includes both volatile memory (e.g., RAM) and non-volatile memory (e.g., ROM, Flash Memory, or the like). The mobile computing device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile computing devices. The display 228 may be touch-sensitive, and would then also act as an input device.

One or more application programs 266 are loaded into memory 262 and run on the operating system 264. Examples of application programs include phone dialer programs, email programs, scheduling programs, PIM (personal information management) programs, word processing programs, spreadsheet programs, Internet browser programs, and so forth. In one embodiment, applications 266 further include an application 280 for communicating with a network. The mobile computing device 200 also includes non-volatile storage 268 within the memory 262. The non-volatile storage 268 may be used to store persistent information which should not be lost if the mobile computing device 200 is powered down. The applications 266 may use and store information in the storage 268, such as e-mail or other messages used by an e-mail application, contact information used by a PIM, appointment information used by a scheduling program, documents used by a word processing application, and the like.

The mobile computing device 200 has a power supply 270, which may be implemented as one or more batteries. The power supply 270 might further include an external power source, such as an AC adapter or a powered docking cradle that supplements or recharges the batteries.

The mobile computing device 200 is shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile computing device 200 also includes a radio interface layer 272 that performs the function of transmitting and receiving communications, such as radio frequency communications. The radio interface layer 272 facilitates wireless connectivity between the mobile computing device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for restricting access to sensitive data of a network based spreadsheet document, comprising:

receiving a spreadsheet document request on a server, wherein the spreadsheet document request includes a client identifier that identifies a client making the spreadsheet document request and a resource identifier that identifies a location of the requested spreadsheet document;

upon receiving the request on the server, accessing a content database in communication with the server to determine access rights based on the client identifier and the resource identifier of the spreadsheet document request;

when the determined access rights are unrestricted, sending an unrestricted spreadsheet document from the server to the requesting client;

when the determined access rights are completely restricted, sending a message from the server to the requesting client that indicates that access is not permitted;

when the determined access rights are limited, accessing a configuration account of the server to determine whether a spreadsheet document governor is accessible to the server;

when the determined access rights are limited and a spreadsheet document governor is not accessible to the server, sending a message from the server to the requesting client that indicates that access is not permitted; and when the determined access rights are limited and a spreadsheet document governor is accessible to the server, sending a request from the server to the spreadsheet document governor to generate a restricted spreadsheet document on behalf of the client, based on the request from the server, sending a request from the spreadsheet document governor to the content database requesting an unrestricted spreadsheet document, based on the request from the spreadsheet document governor, obtaining the unrestricted spreadsheet document on the spreadsheet document governor, after receiving the unrestricted spreadsheet document, processing the unrestricted spreadsheet document on the spreadsheet document governor to generate a limited access spreadsheet document, wherein processing includes providing a restriction to access of sensitive data based on the determined access rights of the content database, after processing, sending the limited access spreadsheet document from the spreadsheet document governor to the server, and after receiving the limited access spreadsheet document on the server, sending the limited access spreadsheet document to the client making the request, wherein the client is restricted from accessing the sensitive data of the requested spreadsheet document.

2. The computer-implemented method of claim 1, wherein the server is at least one member of a group comprising: a web server and a file share server.

3. The computer-implemented method of claim 1, wherein accessing a content database associated with the server to determine access rights includes at least one member of a group comprising: accessing an access control list that includes a list of rights associated with a user, accessing the requested spreadsheet document and determining access rights from a header of the spreadsheet document, access the requested spreadsheet document and determining access rights from a footer of the spreadsheet document, and accessing a separate program to determine access rights.

4. The computer-implemented method of claim 1, wherein unrestricted access rights include unrestricted access rights to a value of a spreadsheet document and a formula associated with the value of the spreadsheet document.

5. The computer-implemented method of claim 1, wherein limited access rights include a browse right.

6. The computer-implemented method of claim 1, wherein limited access rights include a least one member of a group comprising: a read right, an execute right, and a delete right.

7. The computer-implemented method of claim 1, wherein limited access rights include a right to view a value of a spreadsheet document and a view restriction of a formula causing the value of the spreadsheet document.

8. The computer-implemented method of claim 1, wherein the spreadsheet document governor is at least one member of a group comprising: an application associated with the server, a web-based application, and a spreadsheet calculation server.

9. The computer-implemented method of claim 1, wherein sensitive data includes at least one member of a group comprising: external data references, intellectual property data, formulas, equations, edits, versions, and personalized information.

10. The computer-implemented method of claim 1, wherein processing the unrestricted spreadsheet document on the document governor to generate a limited access spreadsheet document includes at least one member of a group comprising: generating the limited access spreadsheet document as an XML document, and generating the limited access spreadsheet document as an HTML document.

11. The computer-implemented method of claim 1, wherein sending the limited access spreadsheet document to the client making the request includes prior to sending the limited access spreadsheet document, converting the limited access spreadsheet document into at least one member of a group comprising: an XML version of the limited access spreadsheet document, and an HTML version of the limited access spreadsheet document.

12. A computer-readable storage medium having computer-executable instructions for restricting access to sensitive data of a network based document, the instructions comprising:

receiving a document request on a server, wherein the document request includes a client identifier that identifies a client of the document request;

upon receiving the request on the server, accessing a content database of the server to determine access rights based on the client identifier;

when the determined access rights are limited, accessing a document governor to generate a restricted document on behalf of the client, sending a request from the document governor to the content database requesting an unrestricted document, based on the request from the document governor, obtaining the unrestricted document on the document governor, processing the unrestricted document on the document governor to generate a limited access document, wherein processing includes providing a restriction to access of sensitive data based on the determined access rights of the content database, sending the generated limited access document from the document governor to the server, and sending the limited access document to the client of the request, wherein the client is restricted from accessing the sensitive data of the requested document.

13. The computer-readable storage medium of claim 12, wherein the server is at least one member of a group comprising: a web server and a file share server.

14. The computer-readable storage medium of claim 12, wherein accessing a content database associated with the server to determine access rights includes at least one member of a group comprising: accessing an access control list that includes a list of rights associated with a user, accessing the requested document and determining access rights from a header of the document, access the requested document and determining access rights from a footer of the document, and accessing a separate program to determine access rights.

15. The computer-readable storage medium of claim 12, wherein limited access rights include a browse right.

16. The computer-readable storage medium of claim 12, wherein limited access rights include a least one member of a group comprising: a read right, an execute right, and a delete right.

17. The computer-readable storage medium of claim 12, wherein limited access rights include a right to view a value of a document and a view restriction of a formula associated with the value of the document.

18. The computer-readable storage medium of claim 12, wherein the document governor is at least one member of a group comprising: an application associated with the server, and a web-based application.

19. The computer-readable storage medium of claim 12, wherein sensitive data includes at least one member of a group comprising: external data references, intellectual property data, formulas, equations, edits, versions, and personalized information.

20. The computer-readable storage medium of claim 12, wherein processing the unrestricted document on the document governor to generate a limited access document includes at least one member of a group comprising: generating the limited access document as an XML document, and generating the limited access document as an HTML document.

21. The computer-readable storage medium of claim 12, wherein sending the limited access document to the client associated with the request includes prior to sending the limited access document, converting the limited access document into at least one member of a group comprising: an XML version of the limited access document, and an HTML version of the limited access document.

22. The computer-readable storage medium of claim 12, wherein the document is at least one member of a group comprising: a spreadsheet document, a word processing document, a workbook document, a web page, an email, and a notes document.

23. A system for restricting access to sensitive data of a network based document, comprising:
 a processor; and
 a memory having computer executable instructions stored thereon, wherein the computer executable instructions are configured for:
  receiving a document request on a server, wherein the document request includes a client identifier that identifies a client of the document request;
  upon receiving the request on the server, accessing a content database of the server to determine access rights based on the client identifier;
  when the determined access rights are limited,
   accessing a document governor to generate a restricted document on behalf of the client,
   sending a request from the document governor to the content database requesting an unrestricted document,
   based on the request from the document governor, obtaining the unrestricted document on the document governor,
   after obtaining the unrestricted document, processing the unrestricted document on the document governor to generate a limited access document, wherein processing includes providing a restriction to access of sensitive data based on the determined access rights of the content database,
   after processing, sending the generated limited access document from the document governor to the server, and
   after receiving the generated limited access document on the server, sending the limited access document to the client associated with the request, wherein the client is restricted from accessing the sensitive data of the requested document.

24. The system of claim 23, wherein processing the unrestricted document on the document governor to generate a limited access document includes at least one member of a group comprising: generating the limited access document as an XML document, and generating the limited access document as an HTML document.

25. The system of claim 23, wherein sending the limited access document to the client associated with the request includes prior to sending the limited access document, converting the limited access document into at least one member of a group comprising: an XML version of the limited access document, and an HTML version of the limited access document.

\* \* \* \* \*